(12) United States Patent
Tricoukes et al.

(10) Patent No.: US 8,977,205 B2
(45) Date of Patent: Mar. 10, 2015

(54) HEAD-MOUNTED COMPUTER WITH PERIPHERAL EXPANSION PORT

(75) Inventors: Nicole D. Tricoukes, Seaford, NY (US); Juliet T. Chon, Worcester, MA (US); Ian R. Jenkins, Stony Brook, NY (US); Mark E. Wheeler, Setauket, NY (US); Mitchell Maiman, Ronkonkoma, NY (US); Jorg Schlieffers, Abingdon (GB)

(73) Assignee: Symbol Technologies, Inc., Holtsville, NY (US)

( * ) Notice: Subject to any disclaimer, the term of this patent is extended or adjusted under 35 U.S.C. 154(b) by 253 days.

(21) Appl. No.: 13/267,089

(22) Filed: Oct. 6, 2011

(65) Prior Publication Data

US 2013/0090062 A1  Apr. 11, 2013

(51) Int. Cl.
 *H04B 7/00* (2006.01)
 *H04R 1/10* (2006.01)
 *G02B 27/01* (2006.01)
 *H04B 5/00* (2006.01)
 *H04R 1/02* (2006.01)

(52) U.S. Cl.
 CPC ............ *H04R 1/1008* (2013.01); *G02B 27/017* (2013.01); *G02B 27/0176* (2013.01); *H04B 5/0006* (2013.01); *H04B 5/0062* (2013.01); *H04R 1/028* (2013.01); *H04R 2420/07* (2013.01); *H04R 2460/07* (2013.01); *G02B 2027/0138* (2013.01); *G02B 2027/014* (2013.01)
 USPC .................... 455/41.2; 455/550.1; 455/575.1; 381/122; 361/679.31; 345/8

(58) Field of Classification Search
 CPC ...................................................... G02B 27/017
 USPC ........ 455/41.2, 550.1, 575.1, 575.2; 381/122; 361/679.31; 345/8
 See application file for complete search history.

(56) References Cited

U.S. PATENT DOCUMENTS

2010/0079356 A1* 4/2010 Hoellwarth ........................ 345/8
2014/0139407 A1* 5/2014 Abdollahi et al. ................. 345/8

FOREIGN PATENT DOCUMENTS

WO    WO 2011/097226    *    8/2011    .............. G06F 3/033

* cited by examiner

*Primary Examiner* — Tuan H Nguyen

(57) ABSTRACT

A head-mounted computing device is described. The head-mounted computing device includes a processor. Coupled to the processor is a memory for storing a software application for execution on the processor. A battery provides current to the processor. A frame supports the processor, the memory, and the battery. The frame includes a mechanical coupling feature and an electrical connector for receiving a peripheral.

20 Claims, 8 Drawing Sheets

HEAD-MOUNTED COMPUTER WITH PERIPHERAL EXPANSION PORT

TECHNICAL FIELD

The invention relates generally to a head-mounted computer, and more specifically, to a head-mounted computer having an expansion port for supporting a peripheral.

BACKGROUND

Head-mounted devices, such as Bluetooth headsets have become popular for hands-free calling. These devices are generally small and include an integrated speaker, microphone, processor, memory, and a battery. These devices can be supported by an ear of a user. In some cases, the devices are supported by the crown of a user's head, similar to a conventional headset.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing FIG. A would refer to an element, 10, shown in figure other than FIG. A.

SUMMARY

Figure 1:
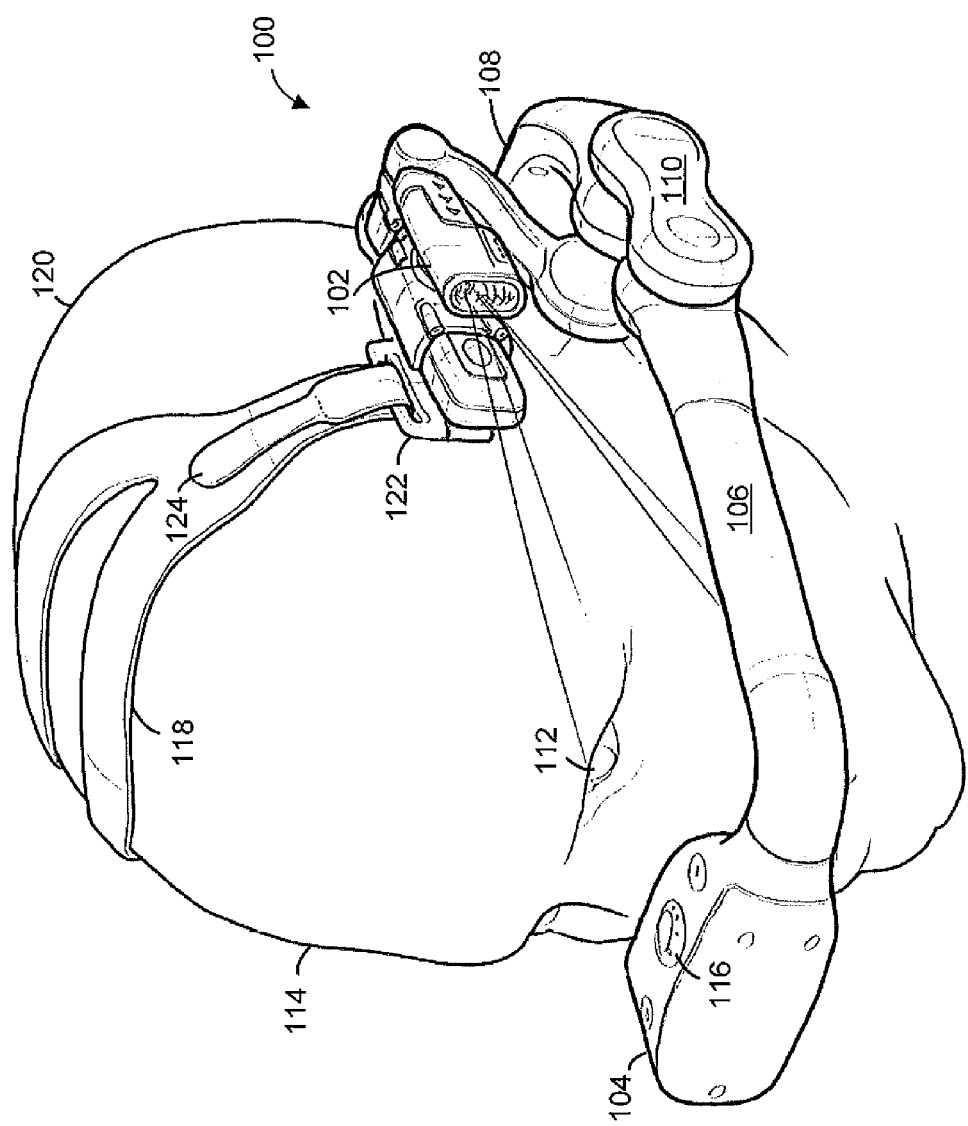
FIG. 1 is a perspective view of a head-mounted computing device including a detachable peripheral according to one embodiment of the invention.

In one aspect, the invention is embodied in a head-mounted computer. The head-mounted computer includes a processor. Coupled to the processor is a memory for storing a software application for execution on the processor. A battery provides current to the processor. A frame supports the processor, the memory, and the battery. The frame includes a mechanical coupling feature and an electrical connector for receiving a peripheral.

In one embodiment, the peripheral includes an attachment feature that mates with the mechanical coupling feature and a connector that mates with the electrical connector. The head-mounted computer can also include a micro-display for displaying data generated by the software application.

A boom can be coupled to the frame for supporting the micro-display. A wireless radio can be coupled to the processor to connect the head-mounted computer to a wireless network. The wireless radio can be a cellular radio, a wireless local area network (WLAN) radio, or a Bluetooth radio.

In one embodiment, the head-mounted computer also includes a user interface. The user interface can be a microphone and/or a speaker. The user interface can include a motion of the frame. For example, the frame can include a motion sensor for detecting a motion of the frame.

The peripheral can be a mobile computer, a motion sensing module, a speaker, a microphone, a flashlight, an imager, a digital camera, a video camera, infrared camera, a laser pointer, a laser-range finder, a radar signal reader, a radio frequency identification (RFID) reader, a temperature sensor, a chemical detector, a telescope, a global positioning system (GPS) module, or a digital compass. The peripheral can be mounted on either a first or a second side of the frame.

In another aspect, the invention is embodied in a head-mounted computer. The head-mounted computer includes a processor. A memory is coupled to the processor for storing a software application for execution on the processor. A user interface is coupled to the processor for inputting information from a user. A wireless radio is coupled to the processor for connecting the head-mounted computer with a wireless network. A micro-display displays data generated by the software application. A battery provides current to the processor and the micro-display. A frame supports the processor, the memory, micro-display and the battery. The frame includes a mechanical coupling feature and an electrical connector. A peripheral includes an attachment feature that mates with the mechanical coupling feature and a connector that mates with the electrical connector.

In one embodiment, the user interface includes a microphone and a speaker. In one embodiment, user interface includes a motion of the frame. The wireless radio can be a cellular radio, a wireless local area network (WLAN) radio, or a Bluetooth radio. In one embodiment, a motion sensor is coupled to the frame for detecting a motion of the frame. In one embodiment, a boom is coupled to the frame for supporting the micro-display.

The peripheral can be a mobile computer, a motion sensing module, a speaker, a microphone, a flashlight, an imager, a digital camera, a video camera, infrared camera, a laser pointer, a laser-range finder, a radar signal reader, a radio frequency identification (RFID) reader, a temperature sensor, a chemical detector, a telescope, a global positioning system (GPS) module, or a digital compass. The peripheral can be mounted on either a first or a second side of the frame.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional mobile computers, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to head-mounted computing devices. In an exemplary embodiment, a peripheral is coupled to a head-mounted computer. The head-mounted computer includes a mechanical coupling for securely coupling the peripheral to the head-mounted computer and an electrical connector for electrically connecting the peripheral to the head-mounted computer.

FIG. 1 is a perspective view of a head-mounted computing device 100 including a detachable peripheral 102 according to one embodiment of the invention. The head-mounted computing device 100 includes a micro-display module 104 supported by a boom 106. The boom 106 is coupled to a frame 108 of the device 100 through a coupling 110. The coupling 110 can feature a large range of motion to allow the boom 106 to be adjusted to a great extent. For example, the boom 106 can be adjusted such that the micro-display module 104 aligns with an eye 112 of a user 114. Any suitable coupling can be used.

Figure 2:
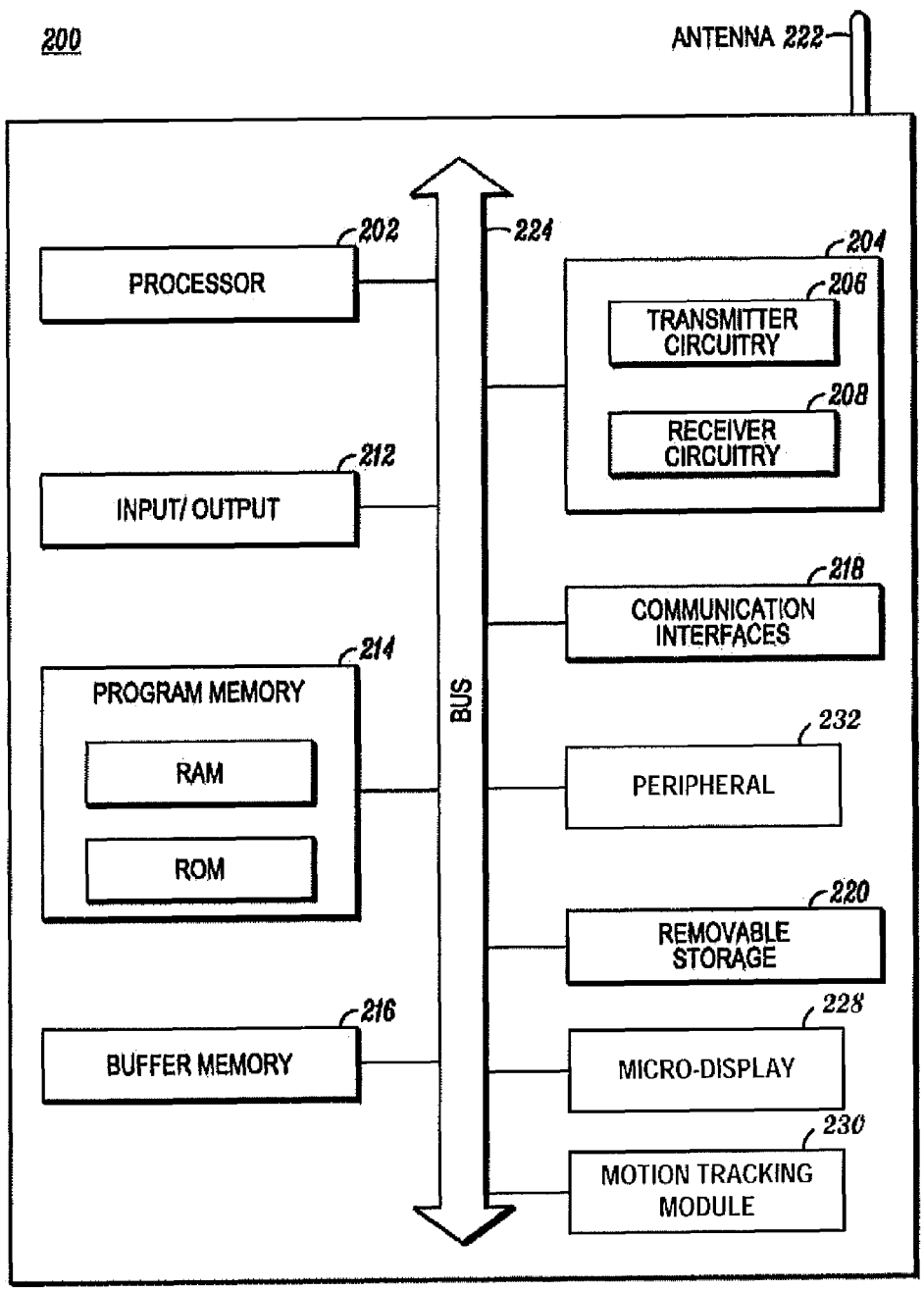
FIG. 2 is a block diagram illustrating the electronic components of the head-mounted computing device of FIG. 1 according to the invention.

The frame 108 contains electronic components, including internal communication components and circuitry, a processor, memory, and a battery as further described with relation to FIG. 2 to enable the device 100 to function and to communicate wirelessly with other devices. The frame 108 can also contain I/O devices (not shown) such as a microphone, one or more audio speakers, an accelerometer, a power control, a volume control, a touchpad, and/or any other suitable input/output devices.

In one embodiment, the micro-display module 104 includes a diopter (not shown) that is optically coupled to a micro-display (not shown) within the micro-display module 104. The diopter can be used to adjust a focus of the micro-display using the diopter control 116. For example, the diopter control 116 adjusts the diopter which changes the focus for individual differences in the vision of each user 114. The micro-display module 104 also includes an optical element (not shown) that can be formed from a plurality of optical components. The optical element creates a virtual display having a larger appearance than the micro-display. For example, an image generated by the micro-display is viewable by the user 114 through the optical element.

The device 100 can also include a head strap 118 that is worn across the crown of the head 120 of the user 114. The head strap 118 can be coupled to the frame 108 through attachment features 122. The length of the head strap 118 can be adjusted using adjustment straps 124.

The removably coupled peripheral 102 is both mechanically and electrically coupled to the frame 108 of the device 100. The mechanical and electrical couplings can be integrated together or can be two separate components, a mechanical coupling and an electrical connector. The mechanical coupling can include a mechanical joint having a range of motion to allow the peripheral 102 to be adjusted as desired. For example, the joint can be an adjustable ball-type joint. Any suitable joint can be used.

The peripheral 102 can be any device that adds functionality to the device 100. In the illustrated embodiment, the peripheral 102 is a flashlight. However, the peripheral 102 can be any suitable component or module such as a mobile computer, a motion sensing module, a speaker, a microphone, a flashlight, an imager, a digital camera, a video camera, infrared camera, a laser pointer, a laser-range finder, a radar signal reader, a radio frequency identification (RFID) reader, a temperature sensor, a chemical detector, a telescope, a global positioning system (GPS) module, or a digital compass.

In one embodiment (not shown), multiple peripherals can be coupled to either side of the frame 108. For example, a video camera can be coupled to one side of the frame 108 while a flashlight can be coupled to the opposite side of the frame 108. In this embodiment, at least two mechanical and electrical couplers (not shown) are present at different locations on the frame 108.

In operation, the user 114 couples the peripheral 102 to the frame 108 of the device 100. In one embodiment, the user 114 can adjust the position of the peripheral 102 relative to the frame 108. In another embodiment, the position of the peripheral 102 is substantially fixed relative to the frame 108.

FIG. 2 is a block diagram 200 illustrating the electronic components of the head-mounted computing device 100 (FIG. 1) according to the invention. The head-mounted computing device 100 contains, among other components, a processor 202, a transceiver 204 including transmitter circuitry 206 and receiver circuitry 208, an antenna 222, the I/O devices 212 described in relation to FIG. 1, a program memory 214 for storing operating instructions that are executed by the processor 202, a buffer memory 216, one or more communication interfaces 218, an optional removable storage 220, and a micro-display 228 coupled to the boom of the head-mounted computing device 100.

The head-mounted computing device 100 can also include a motion tracking module 230 that is rigidly coupled to the frame 108 (FIG. 1) for tracking a movement of the device 100, for example. The motion tracking module 230 can include one or more of an accelerometer, a gyroscope, a global positioning system (GPS) module, magnetometer, and digital compass, for example. Other suitable components can also be used. In some embodiments, the motion tracking module 230 can be used to track a location and/or an orientation of the head-mounted computing device 100.

In one embodiment, the head-mounted computing device 100 is an integrated unit containing many of the components depicted in FIG. 2, as well as any other component necessary for the head-mounted computing device 100 to function. In one embodiment, the electronic components are connected by a bus 224.

The head-mounted computing device 100 can also include a removably coupled peripheral 232. The peripheral 232 can be removably coupled to the frame 108 through a mechanical coupling feature. The peripheral 232 can also include an electrical connector that couples the peripheral 232 to the bus 224. As previously described, the peripheral 232 can be a mobile computer, a motion sensing module, a speaker, a microphone, a flashlight, an imager, a digital camera, a video camera, infrared camera, a laser pointer, a laser-range finder, a radar signal reader, a radio frequency identification (RFID) reader, a temperature sensor, a chemical detector, a telescope, a global positioning system (GPS) module, or a digital compass.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry.

In general, the processor 202 carries out the functions, techniques, and processing tasks associated with the operation of the head-mounted computing device 100. The steps of a method or algorithm described in connection with the embodiments disclosed herein may be embodied directly in hardware, in firmware, in a software module executed by the processor 202, or any combination thereof. Any such software may be implemented as low level instructions (assembly code, machine code, etc.) or as higher-level interpreted or compiled software code (e.g., C, C++, Objective-C, Java, Python, etc.).

The transmitter circuitry 206 and the receiver circuitry 208 enable the head-mounted computing device 100 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the head-mounted computing device 100 and the devices with which it is to communicate. For example, the transmitter and receiver circuitry 206, 208 can be implemented as part of the communication device hardware and software architecture in accordance with known techniques. One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. In one embodiment, the antenna 222 is a local area network (LAN) antenna coupled to the transceiver 204.

The buffer memory 216 may be any form of volatile memory, such as RAM, and is used for temporarily storing information received from the input device 212, for example. The removable memory 220 can be a secure digital (SD) memory card, for example.

The micro-display 228 displays data generated by software applications residing in the memory 214 and executing on the processor 202. The micro-display 228 is coupled to the boom 106 of the device 100. The micro-display 228 can be removably coupled to the device 100 such that it is detachable from the boom 106 by the user 114. Alternatively, the micro-display 228 can be integrated with the boom 106. In one embodiment, the micro-display 228 includes an optical element (not shown) that is optically coupled to the micro-display 228. In one embodiment, the micro-display 228 including the optical element creates a virtual display when the optical element is positioned proximate to the eye 112 of the user 114. For example, depending on the properties of the optical element, the micro-display 228 including the optical element can create a large virtual display having a diagonal dimension of between ten and twenty-two inches. In practice, the virtual display can be any desired size depending on the optical element.

Figure 3:
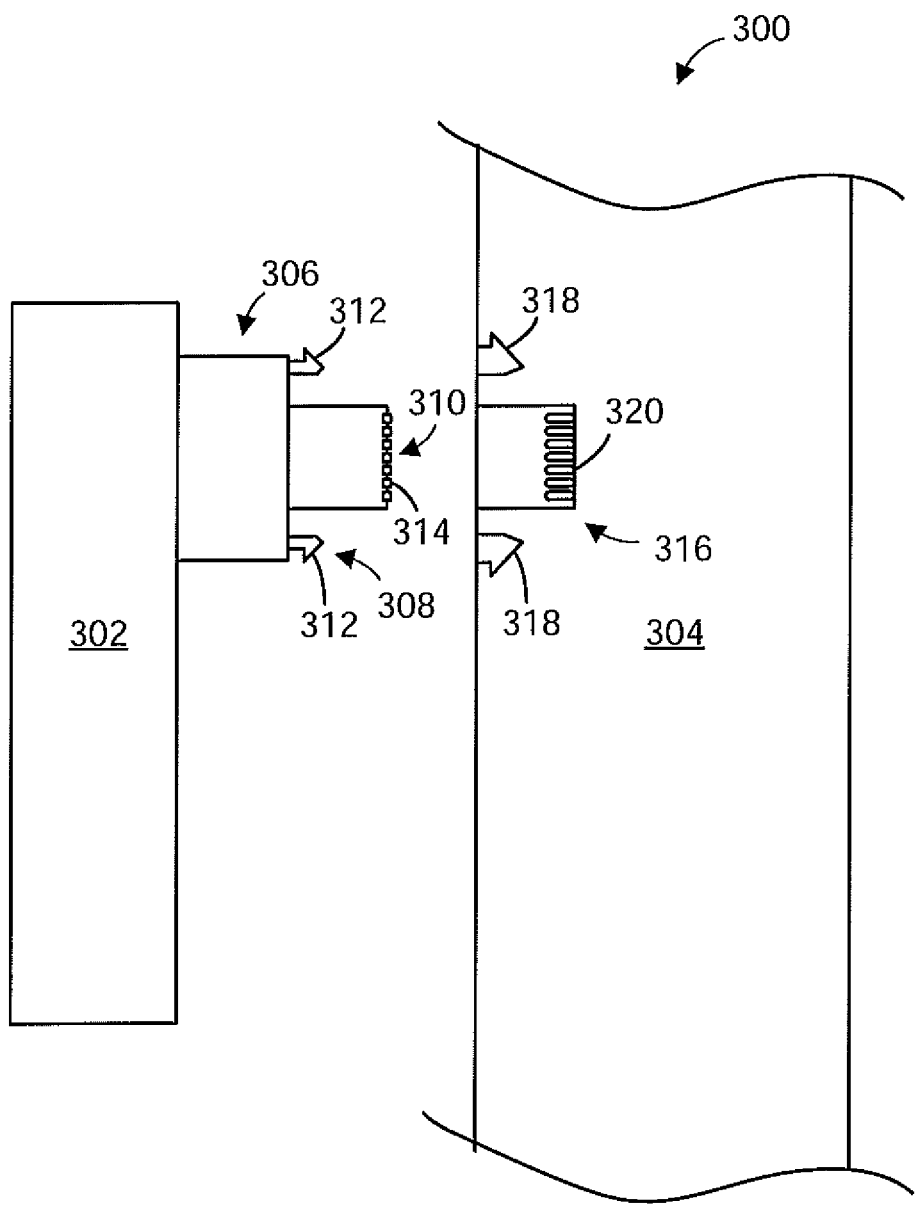
FIG. 3 illustrates a portion of a head-mounted computing device showing a peripheral that can be removably coupled to a frame of the head-mounted computing device.

FIG. 3 illustrates a portion of a head-mounted computing device 300 showing a peripheral 302 that can be removably coupled to a frame 304 of the head-mounted computing device 300. The peripheral 302 includes a coupling 306 having a mechanical coupler 308 and an electrical connector 310. The mechanical coupler 308 includes mechanical coupling features 312. The electrical connector 310 can include electrical contacts 314. In the illustrated embodiment, the mechanical coupler 308 and the electrical connector 310 are integrated as a single component.

The frame 304 includes a coupling 316 that is adapted to mate with the coupling 306 of the peripheral 302. The coupling 316 includes mechanical coupling features 318 and electrical contacts 320. For example, the mechanical coupling features 318 can include recesses in the frame 304.

In one embodiment, each distinct peripheral that is compatible with the head-mounted computing device 300 includes a coupling having mechanical and electrical properties that correspond to the properties of the coupling 306. This ensures that each compatible peripheral can be securely attached to the frame 304 and can electrically connect to the head-mounted computing device 300.

Figure 4:
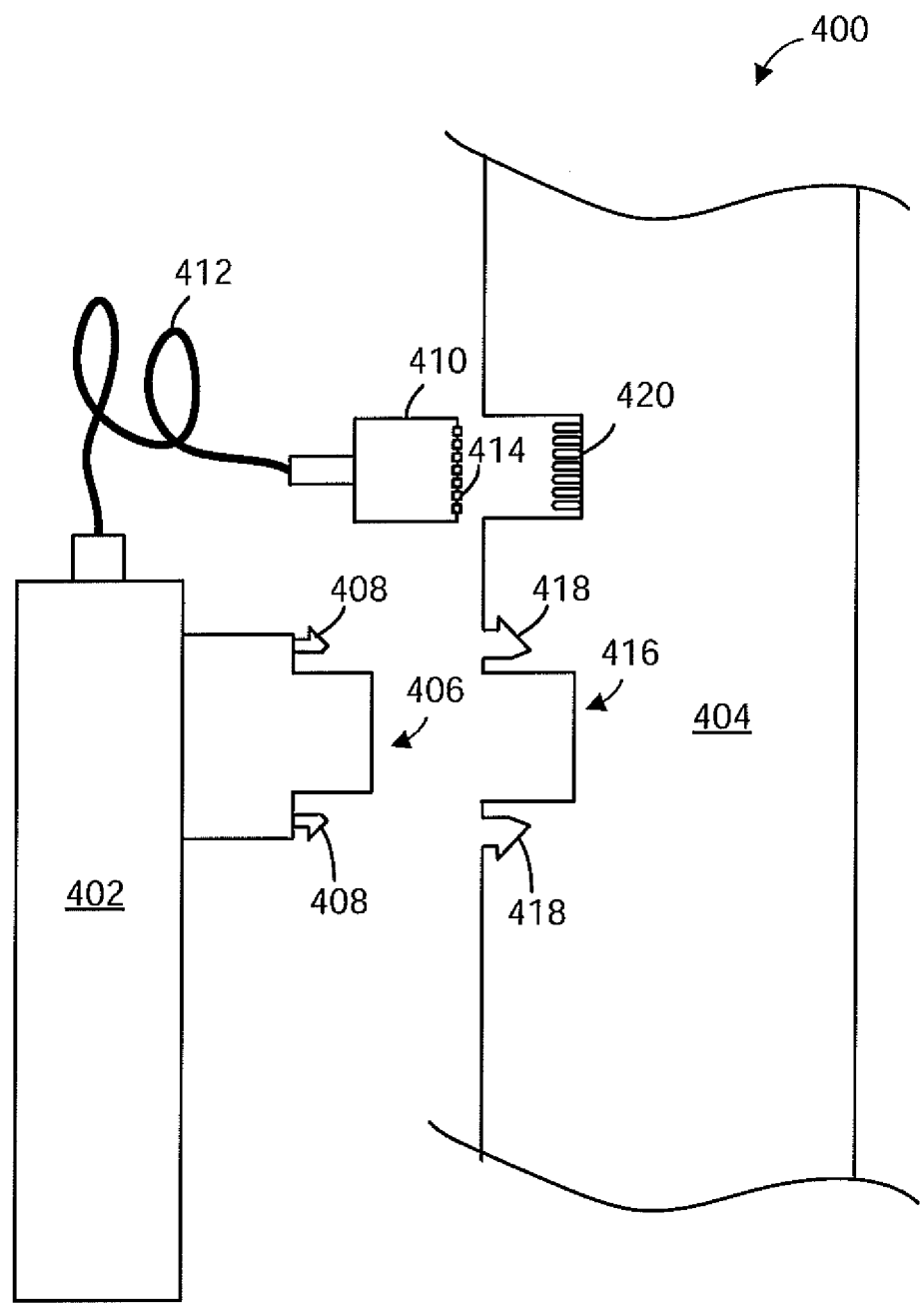
FIG. 4 illustrates a portion of a head-mounted computing device showing another peripheral that can be removably coupled to a frame of the head-mounted computing device.

FIG. 4 illustrates a portion of a head-mounted computing device 400 showing a peripheral 402 that can be removably coupled to a frame 404 of the head-mounted computing device 400. The peripheral 402 includes a mechanical coupling 406 having mechanical features 408. The peripheral 402 also includes an electrical connector 410. In one embodiment, the electrical connector 410 is coupled to the peripheral 402 through a cable 412. Any suitable electrical coupling can be used. The electrical connector 410 can include electrical contacts 414. In the illustrated embodiment, the mechanical coupler 406 and the electrical connector 410 are separate components.

The frame 404 includes a mechanical coupling 416 that is adapted to mate with the mechanical coupling 406 of the peripheral 402. The mechanical coupling 416 includes mechanical coupling features 418. For example, the mechanical coupling features 418 can include recesses in the frame 404. The frame 404 includes an electrical connector 420 that mates with the electrical connector 410 of the peripheral 402.

In one embodiment, each distinct peripheral that is compatible with the head-mounted computing device 400 includes a mechanical coupling having mechanical properties that correspond to the mechanical properties of the mechanical coupling 416 of the frame 404 and an electrical connector having electrical properties that correspond to the electrical properties of the electrical connector 420 of the frame 404. This ensures that each compatible peripheral can be securely attached to the frame 404 and can electrically connect to the head-mounted computing device 400.

Figure 5:
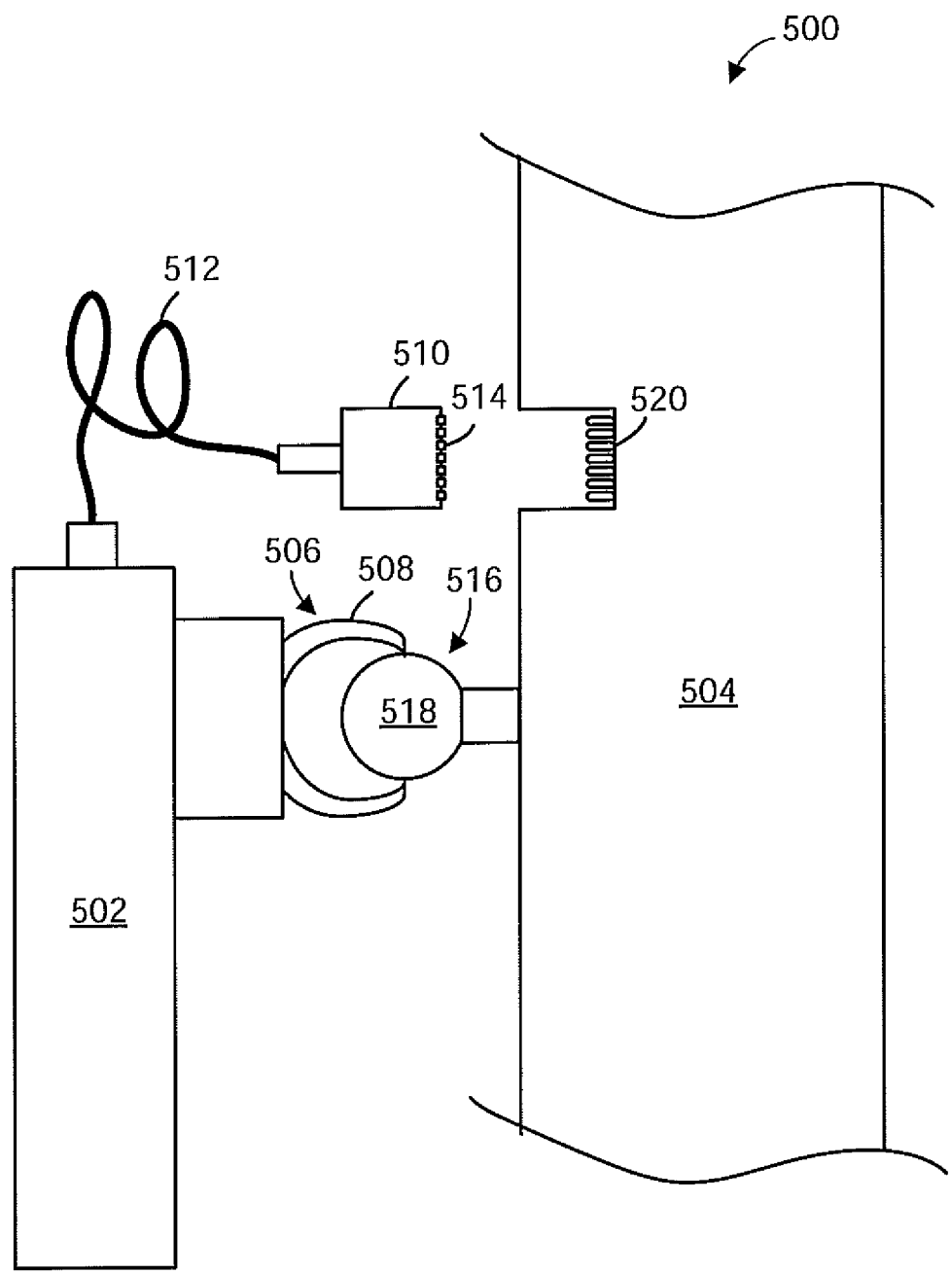
FIG. 5 illustrates a portion of a head-mounted computing device showing yet another peripheral that can be removably coupled to a frame of the head-mounted computing device.

FIG. 5 illustrates a portion of a head-mounted computing device 500 showing a peripheral 502 that can be removably coupled to a frame 504 of the head-mounted computing device 500. The peripheral 502 includes a mechanical coupling 506 having a mechanical coupling feature 508. In one embodiment, the mechanical coupling feature 508 can be a socket in a ball joint mechanical coupling. The peripheral 502 also includes an electrical connector 510. The electrical connector 510 is coupled to the peripheral 502 through a cable 512. The electrical connector 510 can include electrical contacts 514. In the illustrated embodiment, the mechanical coupler 506 and the electrical connector 510 are separate components.

The frame 504 includes a mechanical coupling 516 that is adapted to mate with the mechanical coupling 506 of the peripheral 502. The mechanical coupling 516 includes a mechanical coupling feature 518. For example, the mechanical coupling feature 518 can include a ball that is mechanically coupled to the frame 504. The frame 504 includes an electrical connector 520 that mates with the electrical connector 510 of the peripheral 502.

Figure 6:
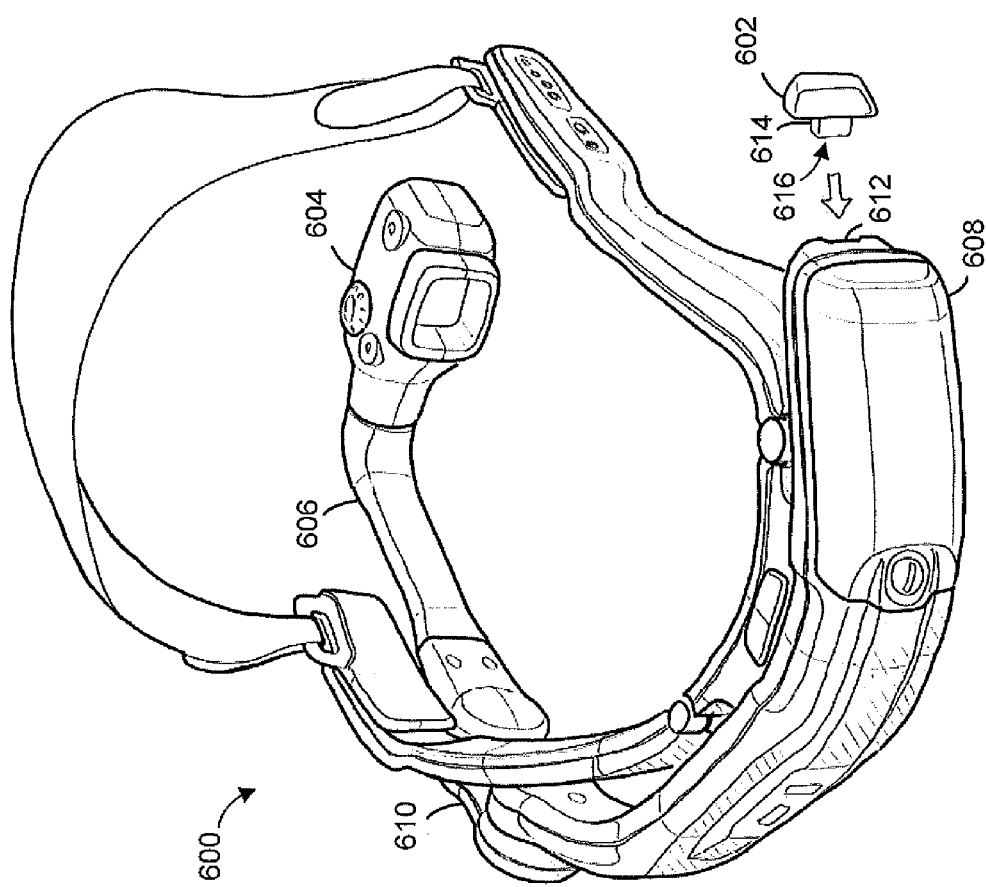
FIG. 6 is a perspective view of a head-mounted computing device including a detachable peripheral according to one embodiment of the invention.

FIG. 6 is a perspective view of a head-mounted computing device 600 including a detachable peripheral 602 according to one embodiment of the invention. The head-mounted computing device 600 includes a micro-display module 604 supported by a boom 606. The boom 606 is coupled to a frame 608 of the device 600 through a coupling 610. The coupling 610 can feature a large range of motion to allow the boom 606 to be adjusted to a great extent.

The removably coupled peripheral 602 is both mechanically and electrically coupled to the frame 608 of the device 600. The mechanical and electrical couplings can be integrated together or can be two separate components, a mechanical coupling and an electrical connector.

In the illustrated embodiment, the peripheral 602 is configured to couple with a universal serial bus (USB) port 612 on the frame 608. The port 612 includes an integrated mechanical coupling feature and an electrical connector for receiving the peripheral 602. The peripheral 602 includes a mechanical coupling feature 614 and an electrical connector 616. The peripheral 602 can be any suitable electronic device or module. For example, the peripheral can include a radio for communicating with a wireless input device or a wireless personal area network (WPAN) device. In one embodiment, the peripheral includes a sensor, such as a motion sensor or a chemical sniffer.

Figure 7:
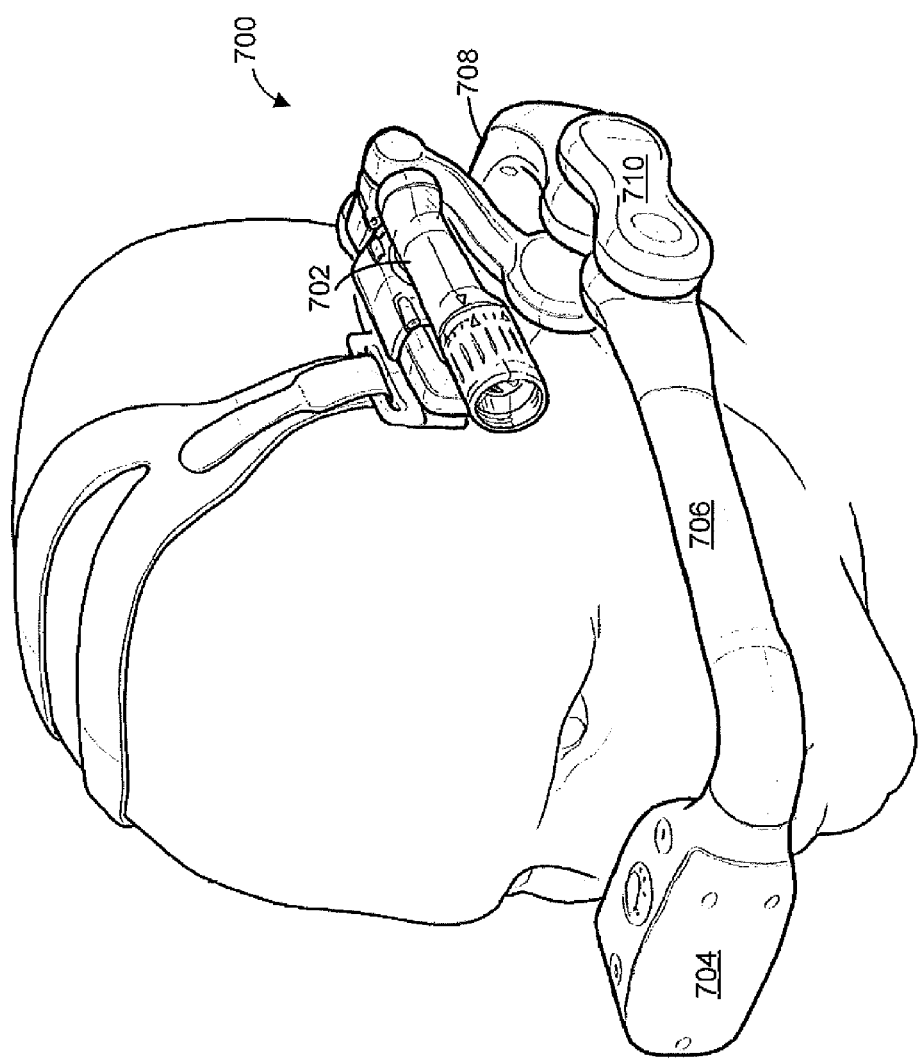
FIG. 7 is a perspective view of a head-mounted computing device including another detachable peripheral according to one embodiment of the invention.

FIG. 7 is a perspective view of a head-mounted computing device 700 including a detachable peripheral 702 according to one embodiment of the invention. The head-mounted computing device 700 includes a micro-display module 704 supported by a boom 706. The boom 706 is coupled to a frame 708 of the device 700 through a coupling 710. The coupling 710 can feature a large range of motion to allow the boom 706 to be adjusted to a great extent.

The removably coupled peripheral 702 is both mechanically and electrically coupled to the frame 708 of the device 700. The mechanical and electrical couplings can be integrated together or can be two separate components, a mechanical coupling and an electrical connector. The mechanical coupling can include a joint having a range of motion to allow the peripheral 702 to be adjusted as desired. In the illustrated embodiment, the peripheral 702 is a telescope. However, the peripheral 702 can be any suitable component or module.

Figure 8:
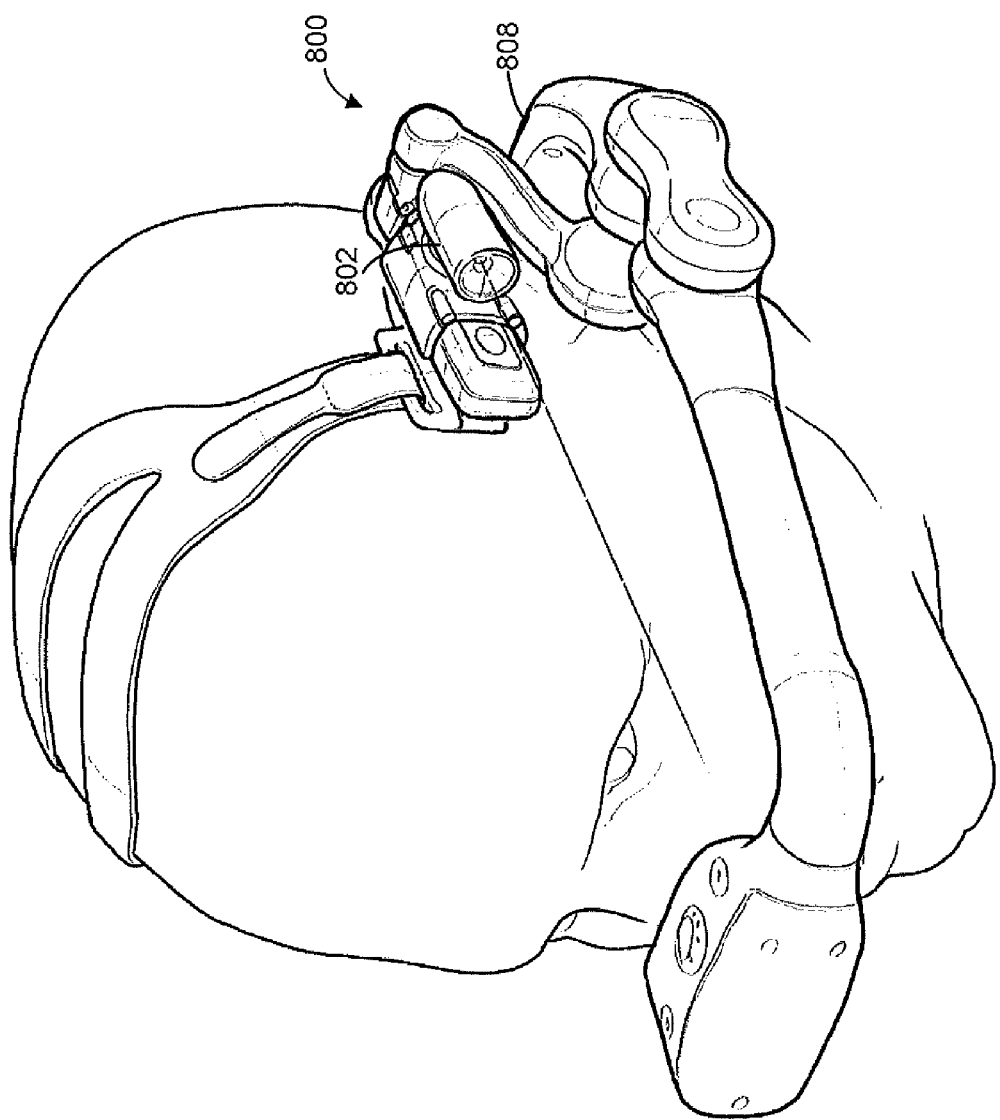
FIG. 8 is a perspective view of a head-mounted computing device including another detachable peripheral according to one embodiment of the invention.

FIG. 8 is a perspective view of a head-mounted computing device 800 including a detachable peripheral 802 according to one embodiment of the invention. The removably coupled peripheral 802 is both mechanically and electrically coupled to a frame 808 of the device 800. In the illustrated embodiment, the peripheral 802 is a laser pointing device. However, the peripheral 802 can be any suitable component or module.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A head-mounted computer comprising:
a processor;
a memory coupled to the processor for storing a software application for execution on the processor;
a battery providing current to the processor; and
a frame for supporting the processor, the memory, and the battery, the frame including a mechanical coupling feature and an electrical connector for receiving a removably coupled peripheral, wherein the mechanical coupling feature comprising a joint to adjust a position of the removably coupled peripheral relative to the frame.

2. The head-mounted computer of claim 1, wherein the removably coupled peripheral comprises an attachment feature that mates with the mechanical coupling feature and a connector that mates with the electrical connector.

3. The head-mounted computer of claim 1 further comprising a micro-display for displaying data generated by the software application.

4. The head-mounted computer of claim 3 further comprising a boom coupled to the frame for supporting the micro-display.

5. The head-mounted computer of claim 1 further comprising a wireless radio coupled to the processor for connection with a wireless network.

6. The head-mounted computer of claim 5, wherein the wireless radio is chosen from the group comprising a cellular radio, a wireless local area network (WLAN) radio and a Bluetooth radio.

7. The head-mounted computer of claim 1 further comprising a user interface.

8. The head-mounted computer of claim 7, wherein the user interface comprises a microphone and a speaker.

9. The head-mounted computer of claim 7, wherein the user interface comprises a motion of the frame.

10. The head-mounted computer of claim 1 further comprising a motion sensor coupled to the frame for detecting a motion of the frame.

11. The head-mounted computer of claim 1, wherein the removably coupled peripheral is chosen from the group comprising a mobile computer, a motion sensing module, a speaker, a microphone, a flashlight, an imager, a digital camera, a video camera, infrared camera, a laser pointer, a laser-range finder, a radar signal reader, a radio frequency identification (RFID) reader, a temperature sensor, a chemical detector, a telescope, a global positioning system (GPS) module, and a digital compass.

12. The head-mounted computer of claim 1, wherein the removably coupled peripheral can be mounted on one of a first and a second side of the frame.

13. A head-mounted computer comprising:
a processor;
a memory coupled to the processor for storing a software application for execution on the processor;
a user interface coupled to the processor for inputting information from a user;
a wireless radio coupled to the processor for connection with a wireless network;
micro-display displaying data generated by the software application;
a battery for providing current to the processor and the micro-display; and
a frame for supporting the processor, the memory, micro-display and the battery, the frame including a mechanical coupling feature and an electrical connector, wherein the mechanical coupling feature comprising a joint; and
a removably coupled peripheral comprising an attachment feature that mates with the mechanical coupling feature and a connector that mates with the electrical connector of the frame, wherein the joint enables a position of the removably coupled peripheral to be adjusted relative to the frame.

14. The head-mounted computer of claim 13, wherein the user interface comprises a microphone and a speaker.

15. The head-mounted computer of claim 13, wherein the user interface comprises a motion of the frame.

16. The head-mounted computer of claim 13, wherein the removably coupled peripheral is chosen from the group comprising a mobile computer, a motion sensing module, a speaker, a microphone, a flashlight, an imager, a digital camera, a video camera, infrared camera, a laser pointer, a laser-range finder, a radar signal reader, radio frequency identification (RFID) reader, a temperature sensor, a chemical detector, a telescope, a global positioning system (GPS) module, and a digital compass.

17. The head-mounted computer of claim 13, wherein the removably coupled peripheral can be mounted on one of a first and a second side of the frame.

18. The head-mounted computer of claim 13, wherein the wireless radio is chosen from the group comprising a cellular radio, a wireless local area network (WLAN) radio and a Bluetooth radio.

19. The head-mounted computer of claim 13 further comprising a motion sensor coupled to the frame for detecting a motion of the frame.

20. The head-mounted computer of claim 13 further comprising a boom coupled to the frame for supporting the micro-display.

* * * * *